United States Patent [19]

Doyle et al.

[11] Patent Number: 4,778,876

[45] Date of Patent: Oct. 18, 1988

[54] VAPOR PHASE PROCESS FOR POLYMERIZING CARBON MONOXIDE AND OLEFINS

[75] Inventors: Michael J. Doyle; Johan C. van Ravenswaay Claasen; Gerrit G. Rosenbrand; Richard L. Wife, all of Amsterdam, Netherlands

[73] Assignee: Shell Oil Company, Houston, Tex.

[21] Appl. No.: 53,780

[22] Filed: May 26, 1987

[30] Foreign Application Priority Data

May 27, 1986 [NL] Netherlands .......................... 8601348

[51] Int. Cl.$^4$ .............................................. C08G 67/02
[52] U.S. Cl. ...................................... 528/392; 528/220
[58] Field of Search .......................................... 528/392

[56] References Cited

U.S. PATENT DOCUMENTS

| | | | |
|---|---|---|---|
| 3,448,140 | 6/1969 | Gamlen | 260/471 |
| 3,689,460 | 9/1972 | Nozaki | 260/63 |
| 3,694,412 | 9/1972 | Nozaki | 260/63 |
| 3,835,123 | 9/1974 | Nozaki | 260/94.9 |
| 3,914,391 | 10/1975 | Nozaki | 423/364 |
| 3,984,388 | 10/1976 | Shryne | 260/63 |
| 4,076,911 | 2/1978 | Fenton | 526/11.1 |
| 4,474,978 | 10/1984 | Drent | 560/24 |

FOREIGN PATENT DOCUMENTS

| | | |
|---|---|---|
| 121965 | 8/1984 | European Pat. Off. . |
| 181014 | 5/1986 | European Pat. Off. . |
| 2046968 | 10/1964 | Japan . |
| 74048406 | 3/1969 | Japan . |
| 1081304 | 3/1965 | United Kingdom . |
| 2058074 | 8/1979 | United Kingdom . |

OTHER PUBLICATIONS

Kirk Othmer Encyclopedia of Chemical Technology, Second Edition vol. 12, p. 132, 1967.
Encyclopedia of Polymer Science and Technology, 1968, vol. 9, 397–402.
J. Am. Chem. Soc. 1982, 104, 3520-2.
Tetrahedron Lett. 1971, 26, 2409–2412.
Organometallics 1984, 3, 866–870.
Proc. Ind. Assoc. Cult. Sci. 1985, 68B, 1-5.
Chemtech 1986, 1, 48–51.
Adv. Polym. Sci. 1986, 73–4, 125–44.
J. Organomet. Chem. 1985, 279, C5–C10.
Polym. Lett. 1965, 3, 703–7.
Chim. Ind. 1971, 53, 939–40.
J. Mol. Catal. 1983, 18, 117–25.

*Primary Examiner*—Harold D. Anderson

[57] ABSTRACT

Polymers of relatively high bulk density are produced at a satisfactory rate by polymerization carried out as a gas phase polymerization, in which the monomers are contacted with the catalyst composition in the substantial absence of a liquid non-polymerizable diluent. Comparison of polymerization in liquid phase and in gas phase polymerization shows that when for both polymerizations the temperature is lowered to achieve the same increase in molecular weight, the gas phase polymerization shows a considerably smaller loss of reaction rate and bulk density. It has further been found that when polymers of the same molecular weights are prepared in both gas phase and liquid phase polymerizations, the rate at which the polymers are produced is higher in the case of the gas phase polymerizations, and, in addition, the gas phase prepared polymers have higher bulk densities.

11 Claims, No Drawings

VAPOR PHASE PROCESS FOR POLYMERIZING CARBON MONOXIDE AND OLEFINS

FIELD OF THE INVENTION

The invention relates to a process for the vapor phase preparation of polymers of carbon monoxide and at least one OLEFINICALLY unsaturated organic compound.

BACKGROUND OF THE INVENTION

Polymers of carbon monoxide and olefins, such as ethylene, have been known and available in limited quantities for many years. For example, such polyketones are disclosed in Kirk-Othmer Encyclopedia of Chemical Technology, Second Edition, Vol. 12, p. 132, 1967, and in Encyclopedia of Polymer Science and Technology, 1968, Vol. 9, 397–402. It is known that polyketones are prepared by contacting CO and ethylene monomers in the presence of a catalyst. High molecular weight polymers of ethylene which contain small quantities of carbon monoxide can be prepared with the aid of Ziegler catalysts. Low molecular weight polymers of carbon monoxide with ethylene and possibly other olefinically unsaturated hydrocarbons in which all monomer units occur distributed at random within the polymer can be prepared with the aid of radical catalysts such as peroxides. A special class of the polymers of carbon monoxide with ethylene comprises the high molecular weight linear polymers in which the monomer units occur in alternating order, which polymers consist of units with the formula —CO—($C_2H_4$)—. Such polymers can be prepared with the aid of, among others, phosphorus-, arsenic-, antimony-, or cyanogen-containing compounds of palladium, cobalt or nickel as catalysts.

High molecular weight linear alternating polymers of carbon monoxide and ethylene consisting of units of the formula —CO—($C_2H_4$)—, can also be prepared by using catalyst compositions comprising:

(a) a compound of a Group VIII metal selected from the group consisting of palladium, cobalt and nickel, (b) an anion of a non-hydrohalogenic acid having a pKa less than 6, and (c) a bidentate ligand of the general formula

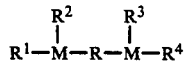

wherein each M is phosphorus, arsenic or antimony, R is a bivalent organic bridging group containing at least two carbon atoms in the bridge and $R^1$, $R^2$, $R^3$ and $R^4$ represent hydrocarbyl groups or substituted hydrocarbyl groups wherein the substituents are polar groups.

Polymerization employing these catalyst compositions of a monomer mixture which, in addition to carbon monoxide, comprises for example ethylene and a lesser amount of one or more alkenically unsaturated hydrocarbons having the general formula $C_xH_y$ leads to the formation of polymers with units of the formula —CO—($C_2H_4$)— and units of the general formula —CO—($C_xH_y$)— occurring randomly distributed throughout the polymer chains. The structures of the copolymers and terpolymers only differ in that in the case of the terpolymers a group —($C_xH_y$)— is encountered at random places in the polymer instead of a —($C_2H_4$)— group.

The polymer preparation employing the above-described catalyst compositions has been carried out as a liquid phase polymerization in which the monomers were contacted with the catalyst composition in a liquid non-polymerizable diluent. Liquid phase polymerization is characterized in that a quantity of diluent is used which is in excess of the polymer formed.

It is common practice in the preparation of the present polymers by means of liquid phase polymerization, to use a liquid non-polymerizable diluent in which the catalyst composition dissolves but the polymers do not dissolve. During such polymerization the polymer is obtained in the form of a suspension in the diluent. After the required degree of polymerization has been achieved, the polymerization is usually terminated by cooling and releasing the pressure. The polymer is isolated from the suspension, for instance, by filtration or centrifugation. The pure diluent is recovered from the remaining liquor, for instance by distillation and can be recycled.

From some applications polymers of relatively high molecular weights are of particular value. The molecular weights of the polymers are influenced by the temperature at which the liquid phase polymerization is carried out, in that at otherwise similar reaction conditions a decrease of the reaction temperature will result in a rise in molecular weight. However, a decreased reaction temperature will be attended with two further effects. A decrease of the reaction temperature results in a decrease of the reaction rate, and a decrease of the reaction temperature will lead to a decrease of the polymer bulk density. Generally, in liquid phase polymerization a decrease of the reaction temperature to obtain only a moderate increase of the molecular weight will give rise to a considerable drop both of the reaction rate and of the bulk density of the polymers. It is desirable that the reaction rate be high and that the polymers with high bulk densities by formed.

SUMMARY OF THE INVENTION

It has been found that polymers of relatively high bulk density are produced at a satisfactory rate by polymerization carried out as a gas phase polymerization, in which the monomers are contacted with the catalyst composition in the substantial absence of a liquid non-polymerizable diluent. Comparison of polymerization in liquid phase and in gas phase polymerization shows that when for both polymerizations the temperature is lowered to achieve the same increase in molecular weight, the gas phase polymerization shows a considerably smaller loss of reaction rate and bulk density. It has further been found that when polymers of the same molecular weights are prepared in both gas phase and liquid phase polymerizations, the rate at which the polymers are produced is higher in the case of the gas phase polymerization, and, in addition, the gas phase prepared polymers have higher bulk densities.

In addition to the advantages with respect to reaction rate, molecular weight and bulk density which the gas phase polymerization offers in comparison with the liquid phase polymerization, the polymer preparation in the gas phase has the additional merit that the above-described filtration or centrifugation steps as well as the distillation step to remove the liquid phase diluent can be omitted. When carried out on a technical scale these separation and purification steps involve considerable cost and it is a major advantage of the gas phase polymerization that in the execution of the polymerization in this manner they can be omitted.

The present invention therefore relates to a process for the preparation of polymers, in which a mixture of carbon monoxide with at least one olefinically unsaturated organic compound is polymerized by contacting the mixture with a catalyst composition based upon (a) a compound of a Group VIII metal selected from the group consisting of palladium, cobalt and nickel, (b) an anion of a nonhydrohalogenic acid with a pKa of less than 6, and (c) a bidentate ligand of the general formula

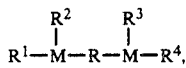

wherein each M is phosphorus, arsenic or antimony. $R^1$, $R^2$, $R^3$ and $R^4$ represent hydrocarbyl groups or substituted hydrocarbyl groups in which the substituents are polar groups and R represents a bivalent organic bridging group containing at least two carbon atoms in the bridge, in the absence of a liquid non-polymerizable diluent.

DESCRIPTION OF THE INVENTION

The gas phase polymerization according to the invention in preferably carried out in the presence of a minor quantity of alcohol and/or hydrogen. Preferred alcohols are monohydric alcohols and in particular the lower alkanols of from 1 to 4 carbon atoms such as methanol, ethanol, propanol, iso-propanol, butanol and iso-butanol. Special preference is given to the use of methanol. If the process according to the invention is carried out in the presence of an alcohol, the quantity of alcohol used should be chosen sufficiently small, e.g., up to 10–15% by volume of the reaction mixture, so that during the polymerization the alcohol will vaporize and is present exclusively in the gaseous state. When hydrogen is employed, an amount of hydrogen up to about 20–25% by volume of the reaction mixture is useful.

The execution of the gas phase polymerization in the presence of a minor quantity of hydrogen presents an additional advantage in that polymers of a higher molecular weight can be prepared. When the polymerization is carried out in the gas phase in the presence of a minor quantity of hydrogen, polymers are prepared at an acceptable reaction rate while attaining higher molecular weights than those attainable in the absence of hydrogen in either the liquid phase or the gas phase polymerization.

The method by which the catalyst composition and the monomer mixture to be polymerized are contacted during the gas phase polymerization is not critical. In one embodiment the catalyst composition can be introduced into the polymerization reactor as such, i.e. without a carrier material. If desired, the catalyst composition is first dissolved or suspended in a liquid medium, which is substantially removed after the solution or suspension has been introduced into the reactor, for instance by spraying. Examples of suitable liquid media are alcohols, such as methanol, hydrocarbons, such as toluene, ketones, such as acetone, esters, such as methyl propionate and ethers, such as diethyl ether. Preference is given to the use of an alcohol as a liquid medium, in particular methanol. When an alcohol is used, the removal thereof is preferably carried out in such a way that a minor quantity remains behind in the catalyst composition.

Preferably, the gas phase polymerization is carried out by using the catalyst composition supported on a carrier material. The catalyst composition is suitably deposited on the carrier material by contacting the carrier material with a solution or suspension of the catalyst composition in a liquid medium, and then substantially removing the medium. As liquid media, the media mentioned above are used, preference against being given to alcohols and methanol in particular. When an alcohol is used as the liquid medium, the removal thereof is preferably carried out in such a way that a minor quantity remains behind in the catalyst composition supported on the carrier. The preferred carrier material is an inert porous carrier material. Suitable carrier materials for the catalyst compositions are organic or inorganic carrier materials. Examples of suitable carrier materials are silica, alumina, talc, charcoal, cellulose, dextrose and dextran gel. Further carrier materials that can be used are polymers, such as polyethylene, polypropylene and polystyrene.

When the gas phase polymerization is carried out by using the catalyst composition supported on a carrier material, products are obtained in which the prepared carbon monoxide copolymer is present together with the carrier material used. If desired, all or part of the carrier material can be removed from the product after the polymerization is completed by treating the product with a solvent in which the carrier material can be dissolved, but not the prepared carbon monoxide copolymer.

In the gas phase polymerization according to the invention the preferred carrier material for the catalyst composition is a polymer of carbon monoxide with one or more olefinically unsaturated organic compounds and in particular a polymer containing alternating units originating from carbon monoxide and olefinically unsaturated monomers. More specifically, preference is given to carbon monoxide copolymers prepared by using a Group VIII metal catalyst composition as defined above. Both polymers prepared by the liquid phase polymerization and polymers prepared by the gas phase polymerization can be used as carriers.

It has been found that at least part of the catalyst remains behind in the polymer and cannot be removed therefrom by washing. The catalyst residue present in these polymers can be used to prepare an additional amount of polymer by contacting the catalyst-containing polymers with additional monomer in the gas phase. These catalyst-polymer residues are particularly effective catalysts and show considerable storage stability.

These catalyst-containing polymeric residues are used in the gas phase polymerization as such, i.e. without additional deposition of catalyst composition. Preferably, however an additional amount of the catalyst composition is emplaced on the catalyst-containing polymers, for instance by contacting the catalyst-containing polymers with a solution or suspension of the catalyst composition in a liquid medium and subsequently substantially removing the medium. In the latter case the polymerization is catalyzed both by the catalyst composition deposited on the carrier polymer and by the catalyst composition which remained behind in the carrier polymer when the latter was prepared.

The Group VIII metal compound in the catalyst compositions is a compound of palladium, cobalt or nickel. Palladium compounds are preferred, particularly palladium salts of carboxylic acids and in particular palladium acetate. Preferred acids to provide the anion of the catalyst complex are oxygen containing acids with a pKa of less than 6 (determined in aqueous solution at 18° C.) such as sulphuric acid, perchloric acid, sulphonic acids, such as methanesulphonic acid, trifluoromethanesulphonic acid and paratoluenesulphonic acid and carboxylic acids, such as trichloroacetic acid, difluoroacetic acid and trifluoroacetic acid. preference is given to paratoluenesulphonic acid. A particularly preferred class of acids have a pKa less than 4; acids with a pKa less than 2 are even more preferred.

In the catalyst compositions, the anion is preferably present in a quantity of 0.5 to 200, and in particular to 0.1 to 10, equivalents of anion per gram atom of Group VIII metal. The anion is incorporated in the catalyst compositions either in the form of an acid or in the form of a salt. Suitable salts are of transition metals other than Group VIII salts and salts of metals which are not transition metals. Examples of transition metals the salts of which are very suitable for use as anion source are the Group 4B metal zirconium, the Group 5B metal vanadium, the Group 6B metal chromium, the Group 8 metals iron and nickel, the Group 1B metal copper, the lanthanide cerium and the actinides thorium and uranium. Examples of non-transition metals the salts of which are very suitable for use an anion source are the Group 3A metals aluminium and gallium, the Group 4A metals tin and lead and the Group 5A metal antimony. Salts of Group 1A metals, such as lithium, potassium and sodium and salts of Group 2A metals, such as magnesium, are suitable for the present purpose as well.

In some embodiments, additional catalyst modifiers are used to obtain optimum results. For example, quinones, e.g., 1,4-benzoquinone are usefully employed with transition metal salts and ethers with salts of metals which are not transition metals.

If desired, the Group VIII metal and anion catalyst components are combined in a single compound. An example of such a compound is the complex $Pd(CH_3CN)_2(O_3S—C_6H_4—CH_3)_2$, which is prepared by reaction of palladium chloride with the silver salt of para-toluenesulphonic acid in acetontrile as the solvent.

In the bidentate ligand M is preferably phosphorus. The groups $R^1$, $R^2$, $R^3$ and $R^4$ present in the bidentate ligand preferably contain 6 to 14 carbon atoms. Special preference is given to bidentate ligands in which the groups $R^1$, $R^2$, $R^3$ and $R^4$ are phenyl groups or substituted phenyl groups. Substituted $R^1$, $R^2$, $R^3$ and $R^4$ are substituted with alkyl of 1 to 4 carbon atoms or with polar groups such as alkoxy of 1 to 4 carbon atoms, particularly methoxy. The bivalent organic bridging group R preferably contains three carbon atoms in the bridge. Examples of suitable bidentate ligands are
1,3-bis(di-p-tolylphosphino)propane,
1,3-bis(di-p-methoxyphosphino)propane,
1,3-bis(diphenylphosphino)propane, and
2-methyl-2-(methyldiphenylphosphino)-1,3-bis)diphenylphosphino)propane.

Preference is given to the use of either one of the latter two bidentate ligands, and particularly to 1,3-bis(-diphenylphosphino)propane. The bidentate ligand is preferably used in a quantity of from 0.1 to 5 and in particular from 0.5 to 1.5 mol per mol of palladium compound.

Suitable olefinically unsaturated organic compounds that can be polymerized with carbon monoxide according to the invention are compounds which consist exclusively of carbon and hydrogen. The polymerization according to the invention is preferably used for preparing polymers of carbon monoxide with one or more olefinically unsaturated hydrocarbons. Examples of suitable hydrocarbon monomers are ethylene and other α-olefins, such as propylene, butene-1, hexene-1 and octene-1 as well as styrene and alkyl-substituted styrenes such as p-methylstyrene and p-ethylstyrene. Use of ethylene, propylene or mixtures of ethylene and propylene as the olefinically unsaturated hydrocarbon is particularly useful in the polymerization according to the invention, leading to, for example, the preparation of copolymers of carbon monoxide with ethylene and the preparation of terpolymers of carbon monoxide with ethylene and propylene.

The quantity of catalyst composition used in the preparation of the polymers may vary within wide ranges. Per mol of olefinically unsaturated compound to be polymerized, such a quantity of catalyst is preferably used as to contain from $10^{-7}$ to $10^{-3}$ and in particular from $10^{-6}$ to $10^{-4}$ gram atom of Group VIII metal.

The preparation of the polymers is preferably carried out at a temperature of from about 20° to about 200° C., preferably from about 3° to about 150° C., suitable pressures from about 1 to about 200 bar, and in particular a pressure from about 20 to about 100 bar. Temperatures and pressures are selected so as to maintain the reaction mixture in a gaseous phase. In the mixture to be polymerized, the preferred molar ratio of the olefinically unsaturated organic compounds relative to carbon monoxide is from about 10:1 to about 1:5 and in particular from about 5:1 to about 1:2. The methanical character of the polymerization reactor is not critical and reactors that have been found suitable for carrying out the polymerization are mechanically stirred reactors or "fluidized bed" reactors.

The higher the molecular weight of the polymers according to the invention, the higher will be in general the intrinsic viscosity they exhibit. For the determination of the intrinsic viscosity of a polymer according to the invention, four solutions are prepared by dissolving the polymer in four different concentrations at 100° C. in m-cresol. For each of these solutions, the viscosity is measured in a viscometer at 100° C. relative to m-cresol and $T_P$ the outflow time of the polymer solution, the relative viscosity ($\eta_{rel}$) is obtained from $\eta_{rel} = T_o/T_p$. From $\eta_{rel}$ can be calculated the inherent viscosity ($\eta_{inh}$) according to the formula:
where c represents the concentration of the polymer in grams per 100 ml solution. By plotting graphically the $\eta_{inh}$ found for each of the four polymer solutions against the corresponding concentration (c) and then by extrapolating to c=0, the intrinsic viscosity [$\eta$] in dl/g is found. Instead of "intrinsic viscosity", the term recommended by the International Union of Pure and Applied Chemistry, viz. "Limiting Viscosity Number" (LVN) will be used. The polymers according to the invention generally have an LVN of between 0.2 and 5.0 dl/g. Preferred polymers have an LVN of between 0.3 and 4.5 dl/g and in particular an LVN of between 0.4 and 4.0 dl/g.

The polymers according to the invention have good mechanical properties. They can be processed by means of the usual techniques into, among other things, films, sheets, plates, fibers and molded objects. The low molecular weight polymers in particular are used as intermediates for the production of plastics, as components in blends with other polymers (such as waxes and greases) and as plasticizers for other polymers. The higher molecular weight polymers have use and utility as premium thermoplastics for fibers, films, injection molding, compression molding or blowing applications. On account of their properties, the higher molecular weight polymers according to the invention are suitable for many applications, such as in the auto industry, for the manufacture of packaging material for the foods and drinks, as constructional and building material, for the manufacture of cables and for a variety of applications in the domestic sphere. In order to modify their characteristics or to strengthen them, the polymers according to the invention can be employed in combination with many other sorts of materials.

The invention will now be illustrated with the aid of the following examples.

COMPARATIVE EXAMPLE 1

A carbon monoxide/ethylene copolymer was prepared as follows. 125 ml of methanol was introduced into a mechanically stirred autoclave with a volume of 300 ml. After the contents of the autoclave had been brought to a temperature of 85° C., a 1:1 (by mol) carbon monoxide/ethylene mixture was introduced until a pressure of 55 bar was reached. A catalyst solution was then introduced into the autoclave, consisting of:

- 5.5 ml of methanol,
- 0.005 mmol of $Pd(CH_3CN)_2(O_3S—C_6H_4—CH_3)_2$, and
- 0.005 mmol of 2-methyl-2-(methyldiphenylphosphino)-1,3-bis(diphenylphosphino)-propane.

During the polymerization, the pressure was maintained at 55 bar by introduction under pressure of a 1:1 (by mol) carbon monoxide/ethylene mixture. After 3 hours the polymerization was terminated by cooling the reaction mixture down to room temperature and releasing the pressure. The copolymer containing some catalyst residue was filtered off, washed with methanol and dried at 50° C. for 16 hours. The product was 10 g of copolymer having an LVN of 0.4 dl/g and a bulk density of 0.17 g/ml. The polymerization rate was 6600 g of copolymer/g of palladium/hour.

ILLUSTRATIVE EXAMPLE 2

A carbon monoxide/ethylene copolymer was prepared as follows. The carbon monoxide/ethene copolymer product prepared according to Example 1 (10 g) was introduced into a mechanically stirred autoclave of 300 ml content. Air present in the autoclave was expelled by pressurizing the autoclave with nitrogen until a pressure of 50 bar was reached and then releasing the pressure, which procedure was repeated two more times. A 1:1 (by mol) carbon monoxide/ethylene mixture was introduced into the autoclave under pressure. At the same time the contents of the autoclave was heated until a temperature of 85° C. and a pressure of 55 bar were reached. During the polymerization the pressure was maintained at 55 bar by introduction of a 1:1 carbon monoxide/ethylene mixture. After 42 hours the polymerization was terminated by cooling to room temperature and releasing the pressure. 30 G of copolymer was obtained.

COMPARATIVE EXAMPLE 3

A carbon monoxide/ethylene copolymer was prepared substantially in the same way as the copolymer of Example 1, except for the following differences (a) the autoclave had a capacity of 1000 ml and contained 500 ml methanol,
(b) the catalyst solution included 7 ml of methanol,
(c) the reaction pressure was 60 bar and the reaction temperature 65° C., and
(d) the polymerization was terminated after 23.3 hours. The product was 35 g of copolymer having an LVN of 1.0 dl/g and a bulk density of 0.10 g/ml.

The polymerization rate was 2900 g of copolymer/g of palladium/hour. The copolymer obtained was divided into five portions of 7 g each. Each one of these portions was used as a carrier for the preparation of a catalyst to be used in a gas phase experiment (Examples 4, 5, 7, 8 and 9).

ILLUSTRATIVE EXAMPLE 4

A carbon monoxide/ethylene copolymer was prepared as follows. A catalyst was prepared by allowing a catalyst solution comprising

- 2 ml of methanol,
- 0.0095 mmol of palladium acetate,
- 0.0095 mmol of 1,3-bis(diphenylphosphino)propane, and
- 0.0190 mmol of para-toluenesulphonic acid to be absorbed onto a 7 g portion of the copolymer prepared according to Example 3. The catalyst thus prepared was introduced into a mechanically stirred autoclave with a volume of 300 ml. Air present in the autoclave was expelled by pressurizing the autoclave with nitrogen until a pressure of 50 bar was reached and then releasing the pressure, which procedure was repeated two more times. A 1:1 (by mol) carbon monoxide/ethylene mixture was introduced into the autoclave under pressure. At the same time the contents of the autoclave were heated until a temperature of 85° C. and a pressure of 55 bar were reached. During the polymerization the pressure was maintained at 55 bar by introducing a 1:1 carbon monoxide/ethylene mixture. After 21 hours the polymerization was terminated by cooling to room temperature and releasing the pressure. The copolymer was dried at 50° C. for 16 hours. A copolymer with an LVN of 1.4 dl/g and a bulk density of 0.26 g/ml was obtained. The polymerization rate was 3200 g of copolymer/g of palladium/hour.

ILLUSTRATIVE EXAMPLE 5

A carbon monoxide/ethylene copolymer was prepared substantially in the same way as the copolymer of Example 4, except for the following differences (a) the catalyst solution comprised
  - 2 ml of methanol,
  - 0.02 mmol of palladium acetate,
  - 0.02 mmol of 1,3-bis(diphenylphosphino)propane, and
  - 0.04 mmol of para-toluenesulphonic acid,
(b) the reaction temperature was 65° C., and
(c) the polymerization was terminated after 3 hours.

A copolymer with an LVN of 2.4 dl/g and a bulk density of 0.24 g/ml was obtained. The polymerization rate was 3000 g of copolymer/g of palladium/hour.

ILLUSTRATIVE EXAMPLE 6

A mixture of a carbon monoxide/ethylene copolymer and β-cyclodextrin was prepared substantially in the same way as the carbon monoxide/ethylene copolymer of Example 4, except for the following differences (a) a catalyst was used which had been prepared by allowing a catalyst solution comprising 2 ml of methanol, 0.019 mmol of palladium acetate, 0.019 mmol of 1,3-bis(diphenylphosphino)propane and 0.038 mmol of para-toluenesulphonic acid to be absorbed onto 5 g of β-cyclodextrin (cycloheptamylose), and (b) the polymerization was terminated after 5 hours.

A mixture of a carbon monoxide/ethylene copolymer and β-cyclodextrin was obtained, which mixture had an LVN of 0.6 dl/g and a bulk density of 0.16 g/ml. The polymerization rate of the carbon monoxide/ethylene copolymer was 1100 g of copolymer/g of palladium/hour.

ILLUSTRATIVE EXAMPLE 7

A mixture of a carbon monoxide/ethylene/propylene terpolymer and a carbon monoxide/ethylene copolymer was prepared in substantially the same way as the carbon monoxide/ethylene copolymer of Example 4, except for the following differences (a) the catalyst solution comprised 2 ml of methanol, 0.05 mmol of $Pd(CH_3CN)_2(O_3S-C_6H_4-CH_3)_2$, and 0.05 mmol of 2-methyl-2-(methyldiphenylphosphino)-1,3-bis-(diphenylphosphino)propane.

(b) 20 ml of liquid propylene was introduced into the autoclave in addition, (c) during the polymerization liquid propylene was fed into the autoclave at a rate of 0.5 ml/h, and (d) the polymerization was terminated after 46 hours.

A mixture of a carbon monoxide/ethylene/propylene terpolymer and a carbon monoxide/ethylene copolymer was obtained, which mixture had a melting point of 206° C., an LVN of 0.4 dl/g and a bulk density of 0.4 g/ml. The polymerization rate of the carbon monoxide/ethylene/propylene terpolymer was 400 g of terpolymer/g of palladium/hour.

ILLUSTRATIVE EXAMPLE 8

A carbon monoxide ethylene copolymer was prepared as follows. A catalyst was prepared by allowing a catalyst solution comprising 2 ml of acetone, 0.0047 mmol of palladium acetate, 0.0047 mmol of 1,3-bis(diphenylphosphino)propane, and 0.0095 mmol of para-toluenesulphonic acid to be absorbed onto 7 g of the copolymer prepared according to Example 3. The catalyst thus prepared was introduced into a mechanically stirred autoclave with a volume of 300 ml. Air present in the autoclave was expelled by pressurizing the autoclave with nitrogen until a pressure of 50 bar was reached and then releasing the pressure, which procedure was repeated once. A 1:1 (by mol) carbon monoxide/ethylene mixture was introduced into the autoclave until a pressure of 20 bar was reached, followed by hydrogen until a total pressure of 25 bar was reached. Subsequently the contents of the autoclave were brought to 85° C. and a 1:1 carbon monoxide/ethylene mixture was introduced with pressure until a pressure of 55 bar was reached. During the polymerization the pressure was maintained at 55 bar by the introduction of a 1:1 carbon monoxide/ethylene mixture. After 11.6 hours the polymerization was terminated by cooling to room temperature and releasing the pressure. The copolymer was dried at 50° C. for 16 hours. A copolymer with an LVN of 2.1 dl/g and a bulk density of 0.2 g/ml was obtained. The polymerization rate was 1600 g of copolymer/g of palladium/hour.

ILLUSTRATIVE EXAMPLE 9

A carbon monoxide/ethylene copolymer was prepared in substantially the same way as the copolymer of Example 8, except for the following differences (a) the reaction temperature was 65° C., and (b) the polymerization was terminated after 66.2 hours.

A copolymer with an LVN of 10.9 dl/g and a bulk density of 0.17 g/ml was obtained. The polymerization rate was 600 g of copolymer/g of palladium/hour.

COMPARATIVE EXAMPLE 10

A carbon monoxide/ethylene/propylene terpolymer was prepared as follows. A mechanically stirred autoclave with a volume of 3.785 l was charged with 1.41 kg of methanol and 227 g of propene. After the contents of the autoclave had been brought at 45° C., a 1:1 (by mol) carbon monoxide/ethylene mixture was introduced under pressure until a pressure of 45 bar was reached. subsequently a catalyst solution comprising 4.7 ml of methanol, 0.0475 mmol of palladium acetate, 0.0475 mmol of 1,3-bis(diphenylphosphino)propane, and 0.95 mmol of trifluoroacetic acid was fed into the autoclave.

During the polymerization the pressure was maintained at 45 bar by introducing a 1:1 (by mol) carbon monoxide/ethylene mixture. After 136 hours the polymerization was terminated by cooling the reaction mixture down to room temperature and releasing the pressure. The terpolymer was filtered off, washed with methanol and fried under nitrogen at 50° C. A terpolymer with an LVN of 1.3 dl/g, a bulk density of 0.37 g/ml and a melting point of 206° C. was obtained. The polymerization rate was 260 g of terpolymer/g of palladium/hour.

ILLUSTRATIVE EXAMPLE 11

A mixture of a carbon monoxide/ethylene copolymer and a carbon monoxide/ethylene/propylene terpolymer was prepared as follows. A catalyst was prepared by impregnation of 10 g of the terpolymer prepared acording to Example 10 with a catalyst solution comprising 20 ml of acetone, 0.0377 mmol of palladium acetate, 0.0412 mmol of 2-methyl-2-(methyldiphenylphosphino)-1,3-bis(diphenylphosphino)-propane, and 0.0752 mmol para-toluenesulphonic acid.

After completion of the impregnation of the catalyst was dried under nitrogen at 60° C. The catalyst thus prepared was introduced into a "fluidized bed" reactor 175 cm in length and 2 cm in diameter. Any air present in the reactor was expelled by means of nitrogen. After the reactor contents had been brought to 85° C., a 1:1 (by mol) carbon monoxide/ethylene mixture and hydrogen were introduced with pressure until a total pressure of 50 bar (carbon monoxide of 22 bar, ethylene of 22 bar and hydrogen of 6 bar) was reached. With the aid of a circulating gas compressor connected to the reactor a linear gas velocity of 4.2 cm/s was maintained in the reactor during the polymerization. After 5 hours the polymerization was terminated by cooling to room temperature and releasing the pressure. A mixture of a carbon monoxide/ethylene copolymer and a carbon monoxide/ethylene/propylene terpolymer was obtained which had an LVN of 0.96 dl/g and a bulk density of 0.39 g/ml. The polymerization rate of the carbon monoxide/ethylene copolymer was 1700 g of copolymer/g of palladium/hour.

ILLUSTRATIVE EXAMPLE 12

A mixture of a carbon monoxide/ethylene copolymer and a carbon monoxide/ethylene/propylene terpolymer was prepared in substantially the same way as the mixture of Example 11, except for the following differences (a) 10 ml of methanol was introduced after the air had been expelled from the reactor, and (b) after the contents of the reactor had been brought to 85° C., a 1:1 (by mol) carbon monoxide/ethylene mixture was introduced until a total pressure of 50 bar was reached.

A mixture of a carbon monoxide/ethylene copolymer and a carbon monoxide/ethylene/propylene terpolymer was obtained which had an LVN of 1.11 dl/g and a bulk density of 0.40 g/dl. The polymerization rate of the carbon monoxide/ethylene copolymer was 770 g of copolymer/g of palladium/hour.

In calculating the polymerization rates given in Examples 4, 5, 7–9, 11 and 12 it was assumed that the polymeric catalyst carriers contained all the palladium that had been used in their preparation.

Comparison of the results of Examples 1 and 3 shows that in the liquid phase polymerization a decrease of the reaction temperature of from 85° to 65° C. results in an increase of the LVN of from 0.4 to 1.0 dl/g ($\Delta=0.6$ dl/g) combined with a fall in bulk density of from 0.17 to 0.10 g/ml ($\Delta=0.07$ g/ml) as well as a fall in polymerization rate of from 6600 to 2900 g/g/h ($\Delta=3700$ g/g/ml).

Comparison of the results of Examples 4 and 5 shows that in the gas phase polymerization a similar decrease of the reaction temperature of from 85° to 65° C. results in an increase of the LVN of from 1.4 to 2.4 dl/g ($\Delta=1.0$ dl/g) combined with a fall in bulk density of from 0.26 to 0.24 g/ml ($\Delta=0.02$ g/ml) and a fall in polymerization rate of from 3200 to 3000 g/g/h ($\Delta=200$ g/g/h).

Comparison of the results of Examples 4 to 8, both carried out at 85° C. in the gas phase, shows that the polymerization when carried out in the presence of a minor quantity of hydrogen (example 8) results in polymers with higher LVN's. The same phenomenon is seen upon comparison of the results of Examples 5 and 9, both carried out at 65° C. in the gas phase, with Example 9 being executed in the presence of hydrogen. In example 9, an extremely high LVN, of 10.9 dl/g, was achieved owing to the low reaction temperature.

The great influence exerted on the LVN by the presence of hydrogen in the gas phase polymerization is clearly demonstrated by a comparison of the results of Examples 8 and 9 with those of Examples 4 and 5. In both cases a decrease of the reaction temperature of from 85° to 65° C. leads to an increased LVN. Whereas in Examples 4 and 5, which were carried out in the absence of hydrogen, the LVN increases from 1.4 to 2.4 dl/g ($\Delta=1.0$ dl/g), the LVN is seen to increase from 2.1 to 10.9 dl/g ($\Delta=8.8$ dl/g) in Examples 8 and 9, which were carried out in the presence of hydrogen.

With the aid of $^{13}$C-NMR analysis it was established that the carbon monoxide/ethylene copolymers prepared according to Examples 1–6, 8, 9, 11 and 12 had a linear alternating structure and therefore consisted of units of the formula $-CO-(C_2H_4)-$. The copolymers had a melting point of 257° C.

It was also established with the aid of $^{13}$C—NMR analysis that the carbon monoxide/ethylene/propylene terpolymers prepared according to Examples 7 and 10 had a linear structure, consisting of units of the formula $-CO-(C_2H_4)-$ and units of the formula $-CO-(C_3H_8)-$, which units were distributed randomly within the terpolymers.

What is claimed is:

1. The process of producing a linear alternating polymer having units of CO and at least one olefinically unsaturated hydrocarbon compound by reacting carbon monoxide and olefinically unsaturated hydrocarbon compound in the gas phase in the substantial absence of liquid non-polymerizable diluent with a catalyst obtained by contacting (1) a compound of Group VIII metal selected from palladium, cobalt and nickel, (2) the anion of an oxygen-containing acid having a pKa less than 6, and (3) a bidentate ligand of the formula

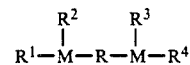

wherein each M is phosphorus, arsenic or antimony, R is a bivalent organic bridging group of 2 to 3 carbon atoms in the bridge and $R^1$, $R^2$, $R^3$ and $R^4$ independently are hydrocarbon or substituted hydrocarbon wherein the substituents are polar, under polymerization conditions in the gas phase.

2. The process of claim 1 wherein the olefinically unsaturated hydrocarbon compound is at least one of ethylene or propylene.

3. The process of claim 2 wherein the anion is the anion of an oxygen-containing acid having a pKa less than 4.

4. The process of claim 3 wherein M is phosphorus.

5. The process of claim 3 wherein the Group VIII metal compound is palladium.

6. The process of claim 3 wherein the Group VIII metal is nickel.

7. The process of claim 4 wherein R is a bridging group of three carbon atoms and $R^1$, $R^2$, $R^3$ and $R^4$ is phenyl.

8. The process of producing a linear alternating polymer having units of CO and ethylene by reacting CO and ethylene in the gas phase in the substantial absence of liquid non-polymerizable diluent with a catalyst obtained by contacting (1) a palladium compound, (2) an anion of an oxygen-containing acid having a pKa less than 2, and (3) a bidentate ligand selected from 1,3-bis(diphenylphosphino)propane and 2-methyl-2-(methyldiphenylphosphino)-1,3-bis(diphenylphosphino)-propane.

9. The process of claim 8 wherein the acid is para-toluenesulfonic acid and the bidentate ligand is 1,3-bis(diphenylphosphino)propane.

10. The process of producing a linear alternating polymer having units of CO and ehtylene and propylene by reacting CO and ethylene and propylene in the gas phase in the substantial absence of non-polymerizable diluent with a catalyst obtained by contacting (1) a palladium compound, (2) an anion of an oxygen-containing acid having a pKa less than 2 and (3) a bidentate ligand selected from 1,3-bis(diphenylphosphino)propane and 2-methyl-2-(methyldiphenylphosphino)-1,3-bis(diphenylphosphino)propane.

11. The process of claim 10 wherein the palladium compound is palladium acetate, the acid is para-toluenesulfonic acid and the bidentate ligand is 2-methyl-2-(methyldiphenylphosphino)-1,3-bis(diphenylphosphino)-propane.

* * * * *